2 Sheets—Sheet 1.
P. H. KELLS.
Mower.
No. { 116. / 1,220. }
Reissued Aug. 13. 1861.
Fig. 2.
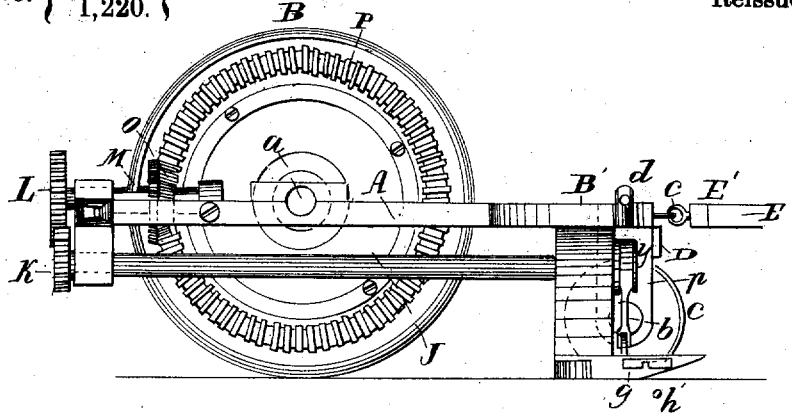
Fig. 1.
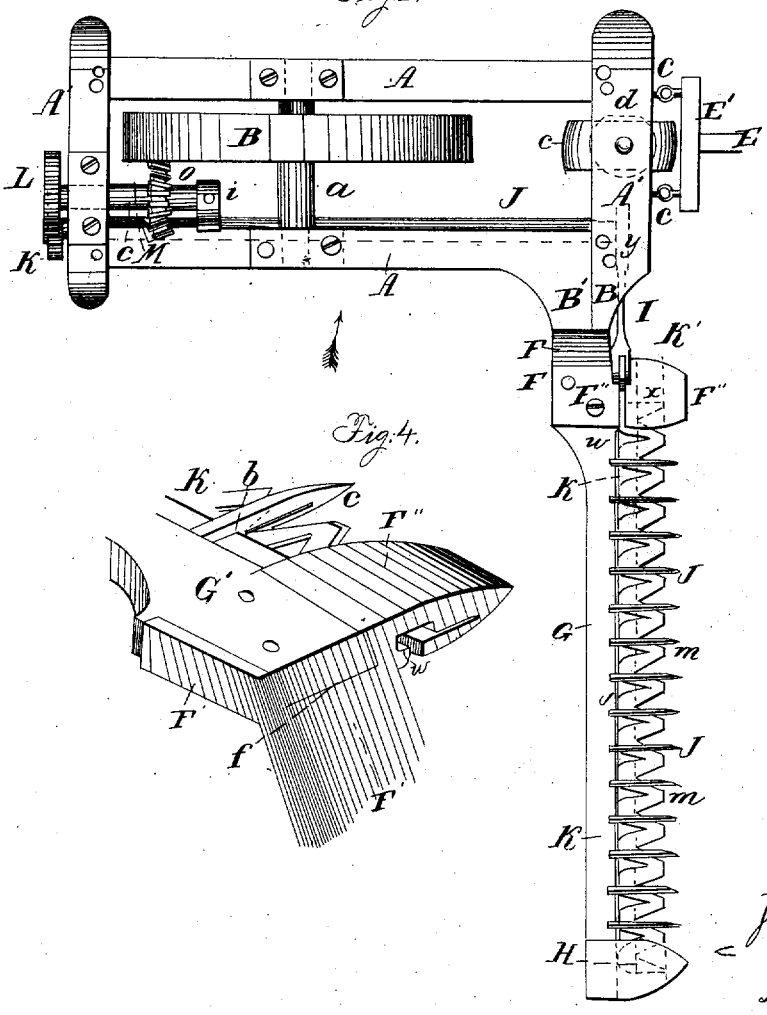
Fig. 4.
J. H. Dodge
Assee of
Philip H. Kells
N. PETERS, PHOTO-LITHOGRAPHER, WASHINGTON, D. C.

2 Sheets—Sheet 2.

P. H. KELLS.

Mower.

No. { 116. / 1,220. }

Reissued Aug. 13, 1861.

Witnesses. Wm Yorke and Co
Randolph Leyh

J H Dodge
Ass'ee of
Philip H Kells

N. PETERS, PHOTO-LITHOGRAPHER, WASHINGTON, D. C.

UNITED STATES PATENT OFFICE.

THOMAS H. DODGE, OF WASHINGTON, D. C., ASSIGNEE OF PHILIP H. KELLS, OF ADRIAN, MICHIGAN.

IMPROVEMENT IN HARVESTERS.

Specification forming part of Letters Patent No. 10,671, dated March 21, 1854; Reissue No. 1,220, dated August 13, 1861.

*To all whom it may concern:*

Be it known that PHILIP H. KELLS, formerly of Hudson, in the county of Columbia, in the State of New York, but now residing in Adrian, in the county of Lenawee, in the State of Michigan, invented certain new and useful Improvements in Harvesters or Mowing-Machines, of which the following is a full, clear, and exact description, reference being had to the annexed drawings, which make part of this specification, and in which—

Figure 3:
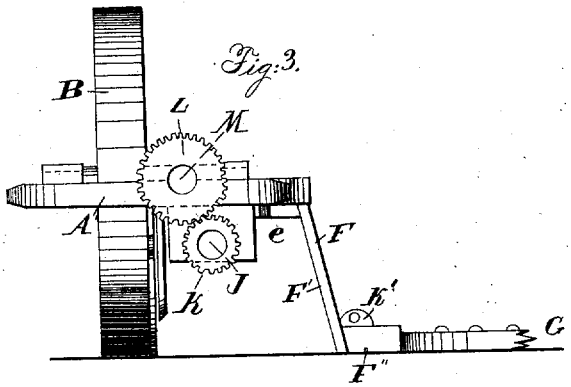
Figure 7:
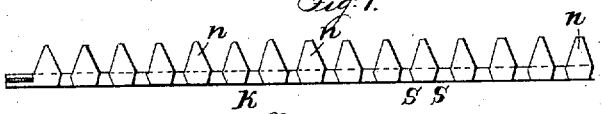
Figure 9:
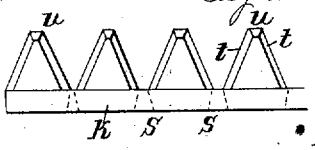
Figure 8:
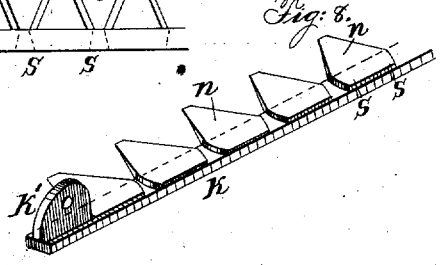
Figure 6:
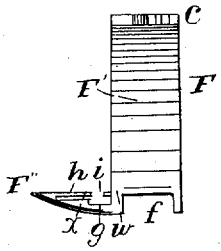
Figure 5:
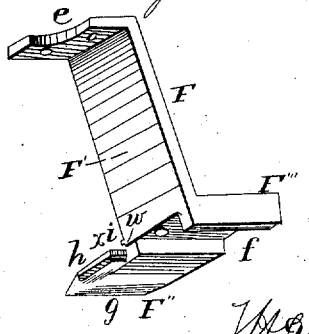

Figure 1 is a plan view of a machine, showing one mode of applying the improvements which form the subject of this patent. Fig. 2 represents a side view of the machine, looking in the direction of arrow 1, Fig. 1. Fig. 3 represents a rear view of a part of the machine, showing the large cog-gear and the small pinion-wheel, main wheel, main frame, coupling or shoe piece, and a portion of the finger-beam. Fig. 4 represents a bottom view, in perspective, of a part of the coupling or shoe piece and the heel end of the finger-beam. Fig. 5 is a view in perspective of the coupling or shoe piece detached. Fig. 6 is a side view of the same. Fig. 7 represents a plan view of the cutter-bar, with "Kells's improved cutter" attached thereto. Fig. 8 represents a view in perspective of part of said cutter-bar and cutters; and Fig. 9 is a bottom view of four cutters attached to their bar, showing the position of the bevel as respects the cutter and cutter-bar.

The side of the machine next to the standing grass, and on which the finger-beam is arranged, I call the "inside," and that next to the cut grass or the opposite side I call the "outside."

In the accompanying drawings, A A A′ A′ represent the main frame composed of longitudinal and cross pieces properly fastened together. This frame is sustained in the main by a large wheel or rolling support, B, whose axle *a* is supported and turns in boxes or bearings fastened to the sides of the main frame. The front of the frame is provided with a swivel-wheel, C, whose journal *b* turns in ears which project down from frame D, whose upper end is swiveled to the front of the frame, as seen at *d*, so that while the main frame is drawn along by the team attached to the tongue E, which projects forward from a cross-piece, E′, hinged to the front of the frame in any suitable manner, in this instance by dead-eyes, as as seen at *c*, wheel C is free to turn in frame D, while in turning the machine, or in case the front of the wheel C should happen to strike an angular stone or stump, such front can turn laterally to pass the same. In this case the wheel-frame D and end *d*, swiveled in the front of the main frame, all turn together.

To the inner front corner of the frame, which is formed by the projecting ends B′ B′ of the pieces A′ A′, is fastened a coupling or shoe piece, F. This coupling or shoe piece is provided in this instance with a knee or projection, *e*, at its top or elevated end, by which it is bolted fast to the under side of the projecting part B′ B′ of the main frame, while the coupling or extension part F′ extends down and out toward the standing grass, and terminates in a shoe part, F″, having a recess, *f*, in which to fasten the heel end of the finger-beam, a groove, *g*, for the heel end of the cutter-bar to work in, together with a long, narrow slit, *h*, for the cutters to pass through, and an opening, *i*, for the projection *k′* on the heel of the cutter-bar *k* to work through when the machine is in operation. The front F″ projects forward and up like a shoe or runner, as fully shown in the drawings. The heel G′ of the finger-beam G is provided with shoulders, whereby, when placed in the recess *f* of the shoe, and one or two bolts passed through both, it is held in a firm and substantial manner. (See Fig. 4.) When the heel of the finger-beam is in place, the lower surfaces of the finger-beam and the part F″ are flush. Consequently they both glide over the ground with ease, and without danger of catching cut stalks or striking against stones or other similar obstructions. The outer end of the finger-beam is provided with a shoe, H, having an opening, *g′*, for the cutter-bar to work through, and a narrow slit, *h′*, for the outer cutter to work through. The outside of shoe H is further cut out or left with a recess, *o*. This recess allows of fine grass or other matter which happens to be carried out by the outer cutter to fall down and thus pass out, whereby the cutter is less liable to clog up, and whereby friction of the outer cutter is obviated. The outer cutter works over this recess when the cutter-bar vibrates, and the matter carried out catches against the shoulder, which forms the inner side of said recess, as seen at *o*, and thus is left or retained in the recess, when by the next outward movement of the cutter-bar said substance is forced out by the cutter upon the ground and there left.

To obviate the clogging up of the cutters has engaged much of the attention of inventors of reaping and mowing machines, and two plans are shown in the drawings to obviate the difficulty. One of these plans is shown in Fig. 1, and consists in cutting out the center of the back of the tooth. By this arrangement it was thought that the working out of the cut stalks and fine grass from under the rear of the fingers would be much facilitated, and the rear of a cutter so made has been extended back of the cutter-bar and made sharp.

To the above plan of making the cutter there exist several practical difficulties, however. In the first place, when the cutter is made with the teeth or cutters all in one piece, as seen in Fig. 1, if one cutter gets injured or broken, then it is very difficult to repair such injury readily without substituting an entire new set of cutters. Again, the cutting out of the center of the back of each tooth or cutter weakens it, and thus renders it liable to get bent, thus tending to complicate the difficulties. The other plan referred to, and which constitutes one of the improvements made by the said KELLS, is shown in Figs. 7, 8, and 9. In this case the cutters *n* are all made or cut out separately, and of the form shown in said figures. In this instance they are fastened to their cutter-bar K, so as to leave a small space or opening between the cutters, as shown. The form of the cutter differs from those heretofore used, in that the rear corners, *s s*, are cut off, so that the cutters, however close they may be fastened to each other on the cutter-bar, will always present or leave an open space of triangular form between their rear corners, whereby gummy matter, fine grass, and like obstructions are effectually worked out from under the fingers. The rear corners of the cutters are cut off in this instance, so as to leave the edges perpendicular. Consequently, in performing the functions of scraping up gummy matter the objections to a beveled edge are obviated. By making the cutter in this form its strength is not really weakened, while if one cutter gets broken or injured its place can be supplied by another as readily as if the rear corners of the cutters had not been cut off, and, in fact, with greater ease, as the cutter is more accessable. The front angles of each cutter are beveled off as far back as the cutter-bar, as indicated at *t t* in the drawings. The point of the cutter is also beveled off on that side, as seen at *a*. In this instance in fastening the cutters to their bar, the beveled edges *t t* are placed toward the cutter-bar, the cutters being fastened to the upper side thereof, so that when the latter vibrates in the notches *l*, formed in each guard to receive it, the unbeveled and sharp edges of each cutter works against the top lips of the guards *j*, which are those called "closed guards"—that is, each lip of the guard is fastened to or touches the finger-beam, the cutter-bar and cutters working through the space or openings left between the bottom and top lips of the guards. The lower lip of the guards *j* is fastened to the finger-beam by being driven into holes left or made for that purpose in the front of the beam. Consequently the bottom of the guards do not project below the bottom of the finger-beam. (See Fig. 4.) This arrangement brings the cutter close to the ground.

In a mowing-machine it is necessary to have the finger-beam as narrow as possible, in order to prevent the cut grass from falling and lodging thereon. It is, however, important, especially when, as in this instance, the finger-beam is supported entirely at the heel end, that it should have sufficient strength at that point to withstand the great strain when the machine is in operation. To combine both of these features in one machine, the heel end of the finger-beam is made in the form shown in the drawings, whereby the size of finger-beam at the heel end is retained of the proper width, and the other part of the finger-beam is left narrow. The notches *l* in the guards are made to correspond with the grooves or recesses *g g′* in shoes F″ and H, and these grooves and notches are also so arranged in respect to the finger-beam that the cutter-bar works a little distance from or in front of the finger-beam, as seen at *v*. This open space allows fine grasses or gummy matter to pass down onto the ground between the back of the cutter-bar and cutters, and front of the finger-beam. The stalks of grass are cut or severed by the upper unbeveled edges of the cutters working in combination with the upper lips of the guards, and consequently in falling back the butt-ends of the stalks are not liable to catch against or lodge on the front edge of the finger-beam as said stalks fall back, whereby there is less liability to clog than if the bevel were on the upper side and the cut below. A projection or joint piece, *k′*, is formed on the upper side of the heel end of the cutter-bar, and in such relative position as respects the cutters that the rear ends of the latter project back of said ear-piece. By this arrangement the rear of the cutter fastened to the heel of the cutter-bar is permitted to work under the short lip, which projects from shoe F″ over the groove *g*, as seen at *w*, while the front of said cutter works under the lip *x*, and thus the heel end of the cutter-bar is kept properly in place. The right end of pitman I is hinged to the hinge-piece *k′*, while the left end of the pitman is connected by a strap to an eccentric on the front end of the eccentric-shaft J, as seen at *g*. A crank can be used, if preferred, to give the proper motion to the cutters. The eccentric-shaft J extends back, and is sustained and turns in two bearings or boxes. The front one supports its front end, being attached to the front end of the main frame, so as to support shaft J, just in rear of the eccentric, which gives a reciprocating motion to the cutter-bar, while the other box or bearing supports the rear of said shaft, and is fastened to the rear end of the main frame, and so arranged as respects the shaft J as to give it a support just in front of a small pinion or gear, K, on the rear end of said shaft, and into which gears a larger cog-gear, L, on the rear end of shaft M, whose outer end is supported by a bearing attached to the rear end of the main frame, and so arranged as to afford a support to the shaft M, just in front of its cog-gear L. Shaft M is, however, arranged higher up and a little to the left of shaft J, as fully shown in the drawings. The inner end of shaft M is supported in a bearing, *i*, fastened to the main frame, and is provided with a small bevel-gear, O, which gears with a large bevel-gear, P, fastened to the inner face of the driving-wheel B, so as to be concentric with shaft or axle *a*, which supports the main frame. The team being attached to the tongue of the machine in any suitable manner and driven forward causes the machine to move forward also on its rolling support, and as wheel B revolves the large bevel-gear P revolves also, whereby the small bevel-gear O is operated, thus giving motion to shaft M and its large cog-gear L, while the latter causes the small pinion or gear K and its eccentric or crank-shaft J to revolve with great speed, thus giving a very rapid reciprocating motion to cutter-bar *k* and the cutters attached thereto, by reason of the connection of pitman I to the heel of the cutter-bar and the eccentric on the front end of shaft J, as before explained.

Any equivalent device for giving a reciprocating motion to the cutter-bar may be applied to the front of shaft J, instead of the eccentric—such, for instance, as the old and well-known crank. As the machine advances, the grass is divided and sustained by the fingers *j* until it is severed or cut by the action of the cutters, when it falls back over the finger-beam upon the ground.

The stubble cut by the above machine is quite short and even, and that, too, on quite uneven ground, since the finger-beam and draft are so combined and arranged, as respects the main frame and its main support, that the finger-beam can rise and fall bodily with the frame and roller to conform to the inequalities of the ground. Again, should an elevation occur at the outer end, shoe H and the outer end of the finger-beam can rise while the heel end remains comparatively near the ground, while if an elevation occurs at the other end in the path of the guiding-wheel C, the outer end can cant down, so that under almost any condition of ground the finger-beam or either end thereof is allowed to run close to the ground, and that, too, independent of the up and down motions of the main wheel.

The employment of a guiding or leading wheel near the heel end of the finger-beam of a mowing-machine, in which said finger-beam is allowed to rest on the ground relieves the machine of a great amount of friction and consequent side draft by taking and bearing the weight of the finger-beam, instead of allowing it all to bear and drag heavily upon the ground. Then, again, a guiding-wheel enables the finger-beam to pass water-furrows without danger of running the points of the guards into the sides of said furrows. The weight of the finger-beam, cutter, and gearing prevents the machine from having a tendency to tip over toward the main supporting-wheel, while the strong connection of the heel of the finger-beam with the main frame enables shoe H on the outer end of the finger-beam to bear with safety any weight or strain that may happen to be thrown in that direction.

The shoe or coupling piece F possesses five elements, which it may be well to consider briefly: first, a shoe or runner part, whereby it is enabled to run or glide over cut grass, instead of pushing it along, whereby the heel end of the cutter is rendered less liable to get clogged up; second, a groove or recess for the heel end of the cutter-bar to work in, whereby the position of the heel of said bar is always retained in line with the grooves or stays which direct and guide the other part of said bar; third, a groove or recess formed in said shoe part for the reception of the heel end of the finger-beam, whereby the finger-beam can be attached to said shoe or coupling piece in an expeditious and yet firm manner, and whereby the great back or draft strain on the heel of the finger-beam is borne by its perpendicular edges bearing against the perpendicular edges of the sides of said groove or recess, thus relieving the bolt or bolts which pass through the heel end of said beam and shoe or coupling-piece of nearly all strain except that of simply holding said parts together; fourth, an elevated or extension part by which to connect said shoe or coupling piece to the main frame, whereby the finger-beam which supports the cutter, and which is attached to the lower part of said shoe or coupling piece, can run close to the ground, while the part of the main frame to which the coupling-arm is attached is carried above the stubble and cut grass and well out of the reach of obstructions; fifth, a front upwardly-projecting inclination or runner part in advance of the point of the connection of the shoe with the main frame, and so arranged as to permit free and unobstructed access over the point thereof to facilitate the clearing out of the heel of the cutter-bar in case it should happen to get clogged up.

By attaching the finger-beam to the front inner corner of the main frame, in combination with a hinged tongue, the front of the frame, together with the entire finger-beam, can rise and fall independent of the up and down motions of the main supporting-wheel. Again, by placing the finger-beam as stated, and using a hinged tongue, in combination with arranging the main supporting-wheel back and to the left of the finger-beam, a rocking motion is allowed said finger-beam, as well as an up-and-down motion, a slight cant of the main supporting and driving wheel being quite sufficient to permit of the same.

In that class of machines in which the finger-beam extends the whole width of the main frame the end of the frame to which the finger-beam is attached has to be tipped down very low, in order to permit the cutters to sever the stalks near the ground, whereby the frame is very liable to run against stumps or stones unless raised by the attendant, while the end of the finger-beam, which projects by the heel of the cutter-bar, is brought very close to the ground, and is also liable not only to run against similar obstructions, but also to catch and drag along cut grass, especially when the same happens to be thrown up into bunches by the feet of the team. Again, in another class of machines in which the hinged tongue is employed the finger-beam used is what is called a "short" one; but in this case the heel end of the finger-beam is bolted or fastened directly to the under side of the rear end or side of the main frame, and consequently the frame is necessarily brought down very near to the ground, being only about or little more than the thickness of the heel end of the finger-beam above the ground when the machine is in operation, and consequently renders the machine liable to the objections before enumerated. By the interposition of a coupling or shoe piece, as described, between the heel of the finger-beam and the main frame, the heel of the finger-beam is supported down close to the ground, while the frame is up above cut grass, stones, and short stumps. The position of joints of the tongue being in a line, or nearly so, with the cutter enables the cutter to rise and fall, so as to conform with great precision to the surface of uneven ground, and that, too, without causing a great amount of pressure on the ground, since the power necessary to cause the joint to be deflected up is applied nearly on a line with the joint, said joint being on a line back of the points of the guards. Again, the position of the small leading-wheel C is such as respects the main wheel and finger-beam as not to impede at all the lateral rocking or wabbling motions of the finger-beam or main wheel, while contributing greatly to the successful operation of the machine.

In the mowing-machine patented by Wm. F. Ketchum, July 10, 1847, and reissued April 26, 1853, provision was made to obviate and prevent "the loose and cut grass lying between the heel of the cutters and driving-wheel from clogging the cutters or retarding the free passage of the machine over the ground." In carrying out his invention the location of the cutter and finger-beam had to be nearly on a line with the axis of the main wheel in order to enable the cutter-bar to run close to the ground, because a rigid tongue was used. If the cutter-bar were placed much back of said line, and if the wheel happened to drop into a hole even on level ground, the finger-beam would have to support nearly the entire weight of the machine, whereby the cutters would be stopped and clogged up. The same difficulty would also occur in case the cutter and finger-bar were placed much in advance of the axis of said wheel, the rigid tongue being used. The lateral upward inclination of the extension piece or part F′, which connects the heel of the finger-beam with the main frame, enables the heel of the finger-beam to be run in under the grass, which is inclined toward the machine, without the top of said grass being caught and carried along by the part which connects the finger-beam with the main frame. By this in-inclination of the lateral connection, and by its arrangement on a line, or nearly so, with the finger-beam, ridges are not liable to be left between or at the intersection of two swaths, nor is the heel of the cutter-bar liable to get clogged up by cut stalks or grass being dragged along by the connection.

When it is desired to use one or more parts of said improvements separately, the skill of the constructor will be quite sufficient to apply the same, and it is evident that some of the improvements are applicable to many of the mowing-machines in use.

For a more full description of some of the parts of the machine and improvements of said KELLS, reference can be had to other patented divisions of even date herewith, one mode of applying said improvements having been described.

What is claimed under this patent as the invention of said PHILIP H. KELLS is—

1. Attaching the shoe which runs on the ground and supports the heel of the finger-beam in a mowing-machine to the front inner corner of the main frame, in combination with the use and employment of a single drive-wheel, a short finger-beam, a hinged tongue, and a small supporting-wheel, whereby as the machine is advanced the finger-beam is allowed to conform to the inequalities of the ground without danger of dragging cut grass, substantially as described.

2. The arrangement with the main frame of a mowing-machine of a hinged tongue and a single main supporting and driving wheel in such a manner that the weight of the frame and the finger-beam will preponderate in front of the axis of said wheel, in combination with supporting the front part of the frame with a small wheel arranged to run on the ground cut by a previous swath in range with the heel of the finger-beam, whereby the cutter will be allowed to run close to the ground and yet the points of the cutters and guards prevented from being thrust into the ground in passing over water furrows and uneven surfaces, substantially as described.

3. The combination, in a mowing-machine, of a main frame, of a proper rolling support to said frame, combined with mechanism for giving motion to the cutter, a short finger-beam, which runs upon the ground, interposed between it and the main frame, and a hinged draft-beam or tongue, when constructed and arranged in relation to each other so that when the machine is advanced by the team the cutter will not only be operated, but will also, together with the finger-beam, have the capability of rising and falling to conform to the inequalities of the ground independent of the up and down motions of said rolling support to the main frame, while both ends of the main frame are maintained in elevated positions, so as to be out of the way of cut grass, short stumps, and similar obstructions, substantially as described.

4. The combination, with the shoe which runs upon the ground and supports the heel of the finger-beam in a mowing-machine, the cutter having the capability stated in the third claim, of a small guiding, leading, or supporting wheel, whereby undue friction of said shoe and finger-beam upon the ground is prevented and the operation of the machine is rendered more uniform and easy and a close cut of stuffle ensured, as described.

5. The combination, in a mowing-machine having the advantages of an open and unobstructed space and a single drive-wheel, as claimed by Wm. F. Ketchum in his Patent of July 10, 1847, and reissued April 26, 1853, of a small wheel or roller with the heel of the short finger-beam, which is supported by a single downwardly-projecting arm to render the action of the machine more easy, and to prevent side draft by bearing a part of the weight of the finger-beam, substantially as described.

6. Placing or arranging the shoe part to which the heel of the finger-beam is attached in a mowing-machine out from and lower than the front corner of the main frame, in combination with supporting it in that position near the ground from the front of the frame by means of an upward inclined connection or extension piece, which extends up from the heel of the finger-beam and toward the front of the frame in a line in range with the finger-beam, in connection with the use of a hinged tongue or draft-beam, whereby as the machine is advanced the front of the frame is well elevated above cut grass and other obstructions, while the finger-beam and cutters are permitted to run close to the ground, and are also allowed to rise and fall to conform to the inequalities in the surface thereof, and the machine rendered of easy draft, substantially as described.

In witness whereof I have hereunto subscribed my name.

THOMAS H. DODGE,
*Assignee of Philip H. Kells.*

In presence of—
WM. YORKE AT LEE,
RANDOLPH COYLE, Jr.